United States Patent [19]

Schlaepfer

[11] 3,997,774
[45] Dec. 14, 1976

[54] METHOD OF INCREASING THE SIGNAL-TO-NOISE RATIO OF A TIME-DEPENDENT SCANNING SIGNAL DURING PERFORMANCE OF A PERIODIC SCANNING METHOD

[75] Inventor: Hansjörg Schlaepfer, Winkel, Switzerland

[73] Assignee: Contraves AG, Zurich, Switzerland

[22] Filed: Oct. 14, 1975

[21] Appl. No.: 622,015

[30] Foreign Application Priority Data

Oct. 25, 1974  Switzerland ............ 14315/74

[52] U.S. Cl. ................... 235/193; 178/6.8; 178/DIG. 12; 235/181
[51] Int. Cl.² ......................... C06G 7/12
[58] Field of Search .......... 235/181, 193, 152, 156; 324/776; 178/DIG. 12, DIG. 21, 6.8; 328/167

[56] References Cited

UNITED STATES PATENTS

| 3,428,794 | 2/1969 | Norsworthy | 235/181 |
|---|---|---|---|
| 3,700,876 | 10/1972 | Gray | 235/181 |
| 3,732,410 | 5/1973 | Mackechnie | 235/181 |
| 3,736,414 | 5/1973 | McAuliffe | 235/181 |
| 3,792,245 | 2/1974 | Hocker et al. | 235/181 |

Primary Examiner—Joseph F. Ruggiero
Attorney, Agent, or Firm—Werner W. Kleeman

[57] ABSTRACT

A method of increasing the signal-to-noise ratio of a time-dependent scanning signal produced during a periodic scanning operation wherein a defined or bounded and centered field is scanned line-by-line by means of a scanning device, there is produced a time-dependent supplementary or additional signal corresponding to the spacing of the momentarily scanned location from the center of the field and possessing a momentary value $r$ as well as a maximum value $R$. Successive line scans occur in directions which in each instance differ from one another by a predetermined angle in such a manner that as a function of the line width the neighboring lines successively adjoin one another at the field boundary and within the field partially overlap and at the field center completely overlap. From the scanning signal there is produced a multiplicity of primary signals forming a sequence, which in this sequence possess a stepwise time-delay which in each case increases by a period of the line scanning. From the supplementary signal there is produced a multiplicity of auxiliary signals, a respective auxiliary signal is multiplied in a respective multiplier with a respective associated primary signal for producing a respective intermediate signal, and the intermediate signals are summated in an adder for producing an output signal.

7 Claims, 3 Drawing Figures

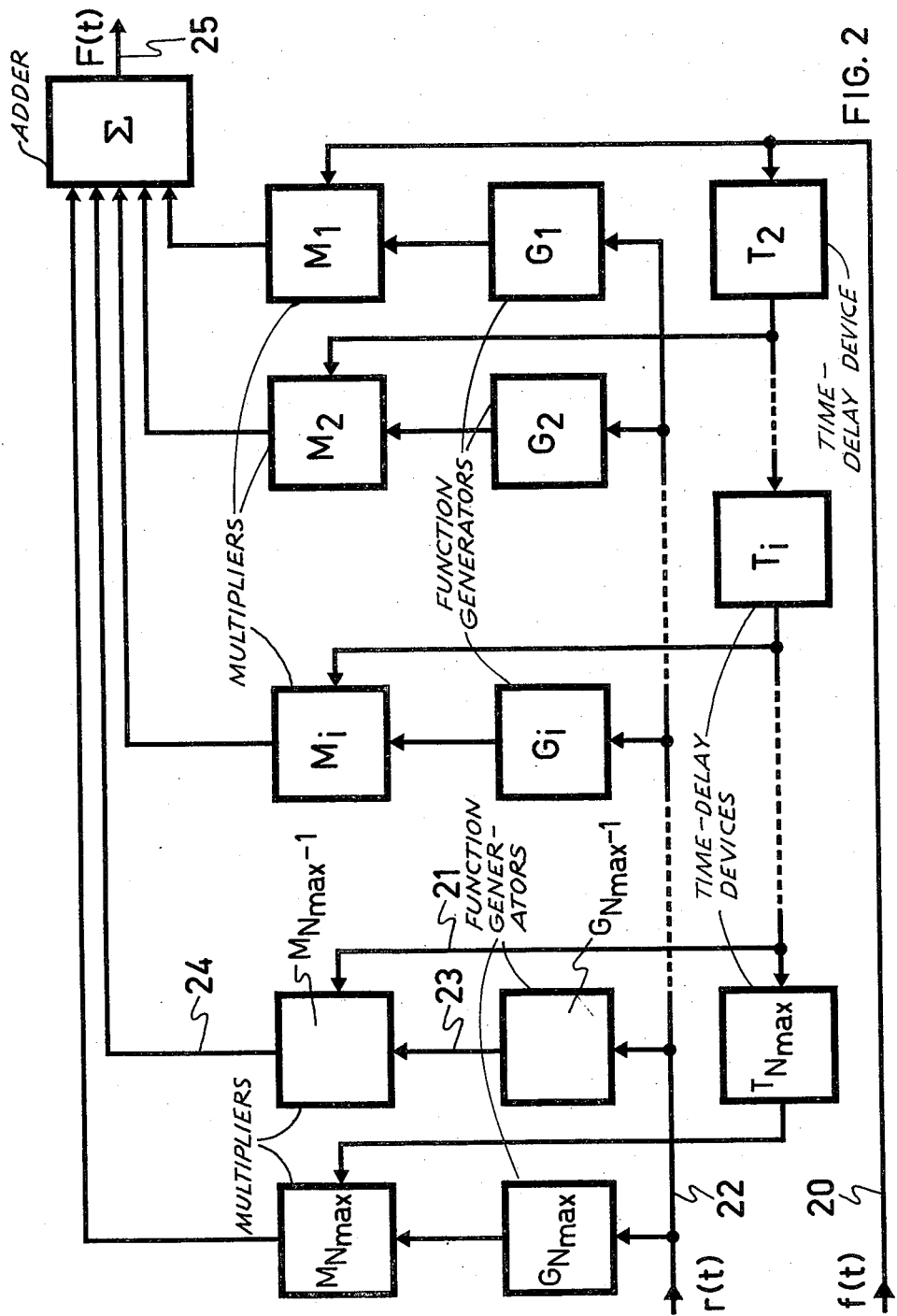

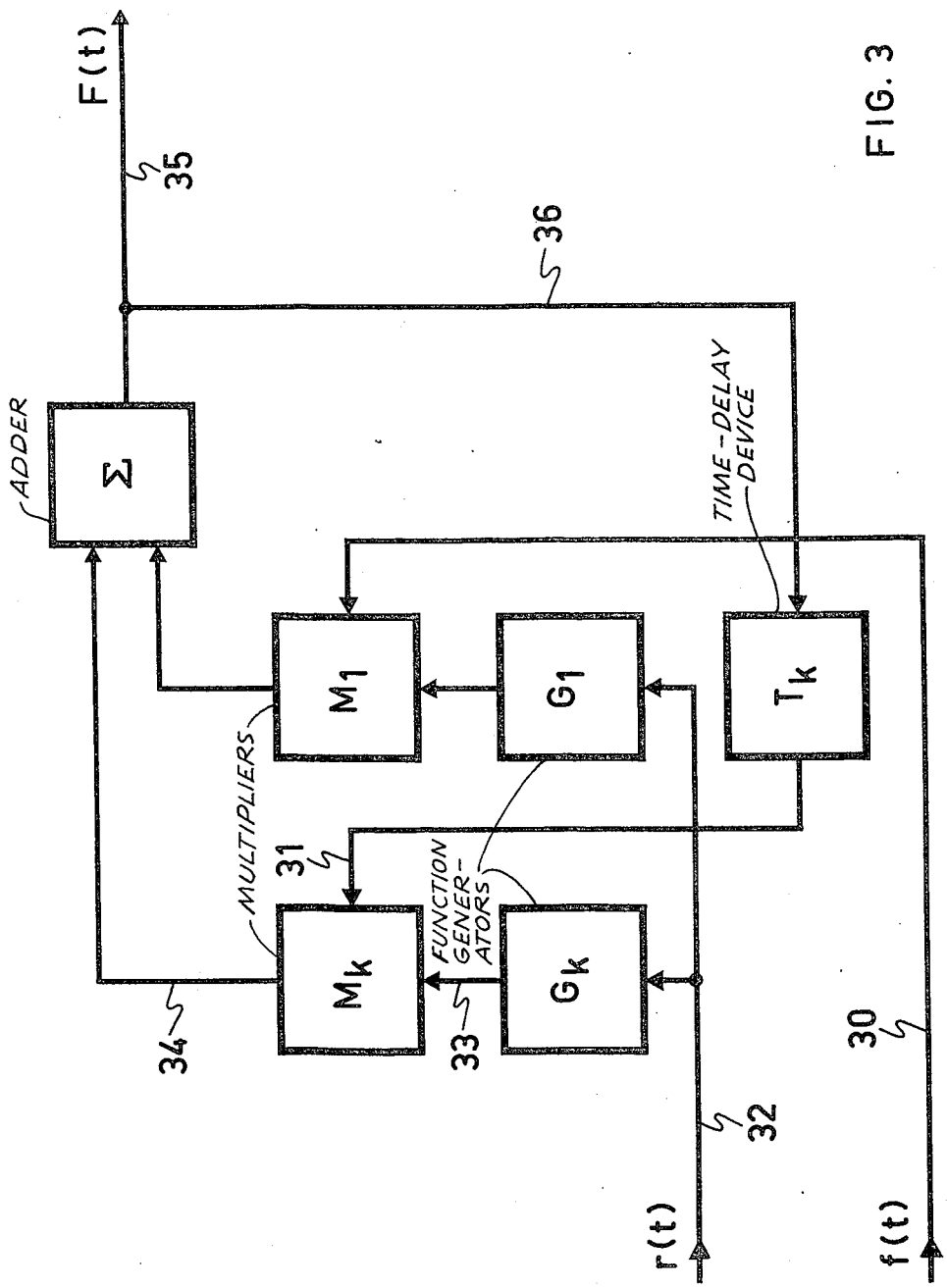

METHOD OF INCREASING THE SIGNAL-TO-NOISE RATIO OF A TIME-DEPENDENT SCANNING SIGNAL DURING PERFORMANCE OF A PERIODIC SCANNING METHOD

BACKGROUND OF THE INVENTION

The present invention relates to a new and improved method of increasing the signal-to-noise ratio of a time-dependent scanning signal produced during a periodic scanning operation or method wherein a delineated or bounded and centered field is scanned line-by-line by means of a scanning device, there is produced a time-dependent additional or supplementary signal corresponding to the spacing of the momentary scanned location from the center of the field and possessing a momentary value r as well as a maximum value R, there further occurring successive line scanning operations in directions which in each case are changed through a predetermined angle in such a manner that as a function of the line width neighboring lines successively contact one another at the field boundary and within the field partially overlap and at the center of the field completely overlap.

In order to improve the comprehensibility of the objectives of the present invention and the solution proposed by the invention, it is necessary to explain the above-mentioned scanning operation on the basis of an example, however with the clear understanding that the above-described introductory portion of the invention is in no way intended to be limited to the described example or embodiment.

In the case of observation devices operating in the infrared region the examined or observed field is optically imaged in an image plane, and this image plane is scanned by a detector responsive to infrared light. This detector possesses a defined surface and scans a circular-shaped image field in the image plane in that it migrates along diameters of the image field. Moreover, it is to be understood that paths or tracks which successively follow one another in time differ by a predetermined angle in such a manner that at the periphery of the image field there just occurs a detection of all image points free of gaps or spaces. All of the paths or tracks radiate through the center of the image field, resulting in an overlapping of the paths. As a consequence thereof, during the course of a complete scanning of the image field one location thereof is scanned a number of times as a function of its spacing from the center of the image field, and specifically with a redundancy or frequency which is approximately proportional to the reciprocal value of the aforementioned spacing. This characteristic is extremely valuable for certain applications, for instance target tracking devices, provided that there is available a technique for optimumly evaluating, on the basis of theory of information, the multiple scanning of image locations. In this regard, there is presupposed that the detector- and amplifier noises impair the interpretation of a detector signal and not for instance the optical background of the observed or examined field.

SUMMARY OF THE INVENTION

It is a primary object of the present invention to provide a new and improved method wherein the aforementioned multiple scanning of image locations can be beneficially employed in order to improve the interpretation and the further utilization of a signal corresponding to the scanning of the field in contrast to merely imaging the field, and, for instance, to insure for an improved evaluation of a signal by threshold value detectors.

A further object of the present invention aims at providing a new and improved method for increasing the signal-to-noise ratio of a time-dependent scanning signal during a periodic scanning operation or method in an extremely efficient, reliable and accurate manner.

Now in order to implement these and still further objects of the invention, which will become more readily apparent as the description proceeds, the method aspects of this development contemplate the features that there is generated from the scanning signal a multiplicity of primary or main signals forming a sequence, which primary signals in such sequence possess a time-delay which incrementally or stepwise increases in each caase through one period of the line scanning. There is formed from the additional or supplementary signal a multiplicity of auxiliary signals with the aid of an appropriate number of function generators. A respective auxiliary signal is multiplied in a respective multiplier with a respective associated primary signal for producing a respective intermediate signal, and the intermediate signals are summated or added in an adder for producing an output signal.

According to a first preferred exemplary embodiment of the method there is produced from the plurality or multiplicity N of primary signals a respective primary signal designated with the rank order or ranking $i$ from the sequence $(2, i, N)$ by means of a respective associated time-delay device, whereas the primary signal designated by the rank order 1 coincides with the scanning signal. By means of a respective function generator there is produced a respective auxiliary signal which is proportional to the product of the supplementary signal and a slope function, the latter of which possesses the value $$\left(\frac{R}{r} - i + 1\right)$$

between a lower boundary or threshold value null and an upper boundary or threshold value 1.

According to a second preferred embodiment of the method in a recursion or recurrence operation there is generated from the multiplicity N of primary signals the signals characterized by or designated with the rank order $i$ from the sequence $(2, i, N)$ by means of a single time-delay device and a feedback of the output signal to such time-delay device, where as the primary signal designated with the rank order 1 coincides with the scanning signal. Furthermore, there is generated from the additional or supplementary signal a respective one of two auxiliary signals in a respective one of two function generators. By means of one function generator there is produced an auxiliary signal proportional to the function $$\left[1 - \exp\left(-\frac{r}{R}\right)\right]$$

which is associated with the primary signal designated by the rank order 1, whereas by means of the other function generator there is generated an auxiliary signal proportional to the function $$\left[\exp\left(-\frac{r}{R}\right)\right]$$

which is associated with the primary signals designated with the rank order $i$ from the order sequence $(2, i, N)$.

In this way there is achieved the result that the time-dependent scanning signal is processed in a correlation operation, considerably improving its signal-to-noise ratio. In the first preferred embodiment of the inventive method the ideal correlation operation is outstandingly approximated with a suitable expenditure in equipment, whereas in the second preferred embodiment there is provided a different approximation solution with considerably less expenditure in equipment but nonetheless still good results.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a block circuit diagram of a first exemplary embodiment of apparatus for carrying out a first exemplary embodiment of the method of this development; and FIG. 3 is a block circuit diagram of a further exemplary construction of apparatus for carrying out a second exemplary embodiment of the method of the present invention.

DETAILED DESCRIPTION OF THE INVENTION

Figure 1:
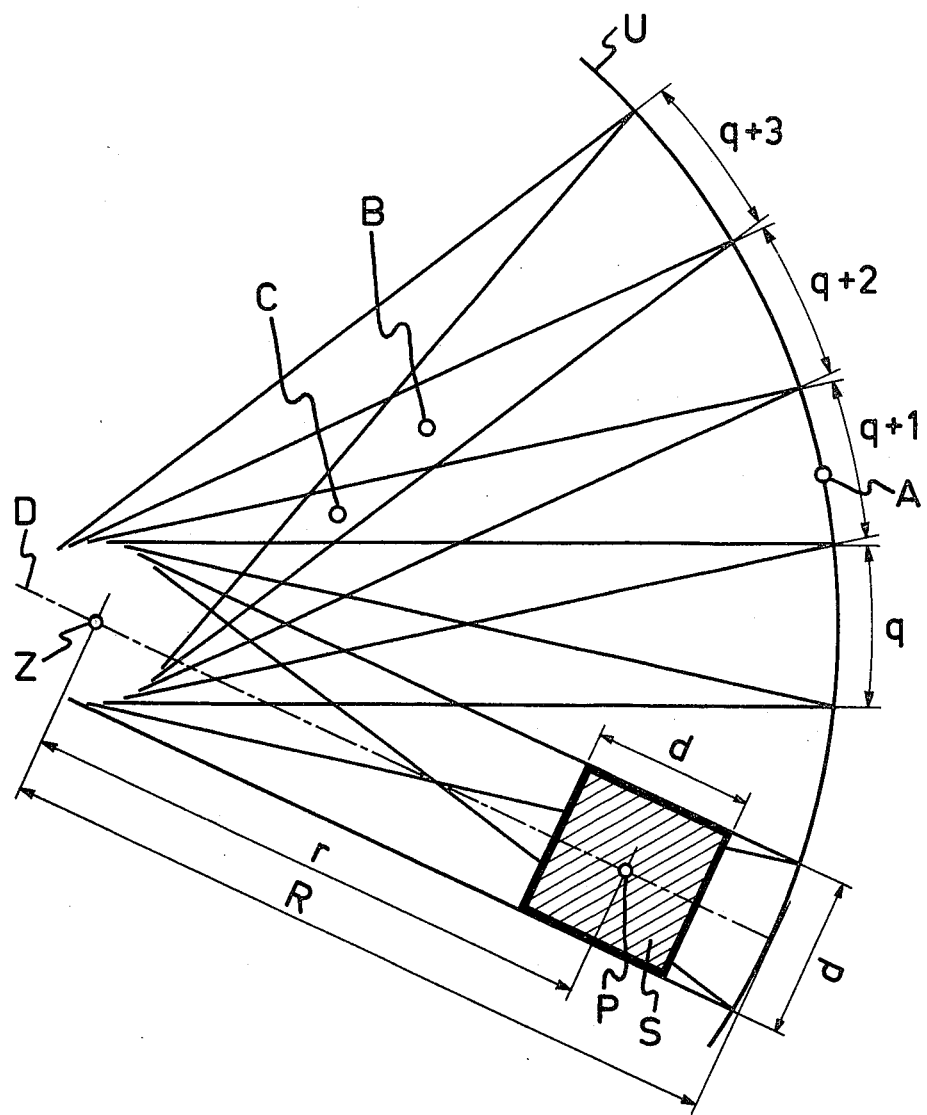
FIG. 1 is a schematic illustration of a scanning operation in an image plane serving to explain and illustrate the teachings of the present invention.

Describing now the drawings, in FIG. 1 there is illustrated a portion or section of a substantially circular-shaped image plane of an infrared observation device. Reference character Z designates the center and reference character U the periphery of such image plane. The radius of the circle enclosing the image plane has the value R. Within the image plane there is located a radiant energy or radiation detector S which, in the exemplary embodiment under discussion, has been shown in the form of a square having a center P and an edge length $d$. The spacing or distance between the centers P and Z amounts to the value $r$. With the aid of not particularly further illustrated conventional means there is produced by means of the radiant energy or radiation detector S a scanning signal which is proportional to the quantity of light impinging or incident thereat, and there is generated an additional or supplementary signal corresponding to the value $r$ and, in the present example, for the sake of simplicity in the disclosure has been assumed to be equal to the value $r$.

The radiation detector S scans at a substantially constant speed the image plane along linear paths or tracks — sometimes hereinafter referred to also as scan lines, the terms scan line or even just line being synonymous to the words path or track and having a width dimension as will be apparent from the description to follow — and its center P migrates along a diameter of the image plane such as, for instance, the diameter D and traverses from the circumference to the circumference i.e. from one end to the other end of the diameter D of the image plane. This operation has been hereinafter conveniently designated as a line scanning operation or simply line scanning.

Upon the completion of each line scanning the radiation detector S returns from the end of its path or scan line to the start of the path and the path or scan line direction is changed through a predetermined angle, reference character Z serving as the center of rotation, in such a manner that the scan path of scan line in its new position or direction, respectively, just adjoins with or contacts the path or scan line in its previous position or direction, respectively, at the periphery or circumference U. As will be apparent from the showing of FIG. 1, the angle through which the scan line direction is varied amounts to the value $$\left[2\cdot\arctan\left(\frac{d}{2R}\right)\right].$$

The entire operation entailing the return of the radiation detector S along the scan line or path as well as the rotation of the scan line direction occurs within a time period which is extremely short in contrast to the time duration of a line scanning operation and therefore is of no consequence. From this there also results the fact that scanning of the entire image plane occurs in a period of time which amounts to a multiple of the time duration of a line scanning, and specifically $$\left(\frac{\pi}{2\cdot\arctan\left(\frac{d}{2R}\right)}\right)$$

or approximately $(\pi R/d)$-times the latter time duration. From the foregoing it will be further understood that the movement of the radiation detector S along its path or scan line, as far as its time-course is concerned, corresponds to a periodic sawtooth functiion, by means of which there can be defined a period of the line scanning and a period of the field scanning.

The preceding description of an image scan only serves for explaining the objectives of the invention and as far as such is concerned is in no way intended to be limiting thereof. Hence, an equivalent object of the invention exists whenever an observed or examined field is scanned in a manner equivalent to the preceding example. For instance, the radiant energy or radiation detectors can be stationary and the rays of light can be deflected through a system of movable mirrors, or the field can be radiated by a laser beam or microwave beam according to the same scanning technique or system and the reflected beams or energy can be detected by a stationary beam or radiation detector. In order to explain the objectives of the invention and the solution provided thereby, it is however, considered to be sufficient to discuss the situation illustrated in FIG. 1.

From the showing of FIG. 1 and upon observing the therein illustrated overlapping of neighboring paths or scan lines of the radiation detector S, it will be seen that an image point possessing the spacing $r$ from the center Z is detected during one-half of a period of the field scanning i.e. a rotation of the scan line direction through $\pi$, depending upon such spacing $r$, one or a number of times. An image point with the spacing R is detected exactly once, since it is located at the circumference or periphery U of the image circle and the paths of the radiation detector S exactly merge or adjoin at one another at such location; this is, for instance, the case for the image point A which is only detected by the path designated by $(q + 1)$. An image point, the spacing of which from the center Z amounts to the value R/2 is detected exactly twice, such as for instance the image point B by the paths or lines designated by $(q+2)$ and $(q+3)$. An image point, the spacing from the center Z of which amounts to the value R/3 is detected exactly three times, such as for instance the image point C by the paths designated by $(q+1)$, $(q+2)$ and $(q +3)$. As a general proposition it can be stated that an image point spacing to the center Z amounting to the value R/N is detected during one-half of a period of the field scanning exactly N-times when the value N is a whole number or integer. If the value N is not a whole number or integer, then the examined or observed image point, depending upon its position in the image field, is detected in accordance with the next higher or next lower situated whole number or integer since a fractional or partial detection cannot physically come into consideration. Finally, an image point, the spacing of which to the center Z is smaller than the width $d$ of the radiation detector S and its path, is detected during each scanning operation, this being the case, for instance, for the center Z itself. In this way there is realized the maximum number of detections for each half-period of the field scanning with the value $$N_{max} = \frac{\pi}{2 \cdot \arctan\left(\frac{d}{2R}\right)}$$

or approximatively $N_{max} = \pi R/d$.

One of the primary objects of the invention is to utilize by means of a suitable method for redundancy of the scanning, that is to say, the multiple scanning of certain locations in the image field during one half-period of the field scanning in order to improve the signal-to-noise ratio of the scanning signal.

The concepts of the invention leading to the solution of this objective resides in the fact that in a correlation operation or method these are summated or added the scanning signals produced during different line periods after they are multiplied by appropriate coefficients and delayed by a suitable number of line periods.

Since the time-dependent signal amplitudes $f(t)$ produced in the radiation detector S during the scanning of the image field for a certain image location during averaging over N-values can be linearly added, but the individual noise amplitudes which cannot be correlated to one another however added as a square power, thus the signal-to-noise ratio in the case of stationary noises is increased during such averaging by the factor N. The scanning signal $f(t)$ thus should be processed into an improved output signal $F(t)$ for those locations which are characterized by the value $r = R/N$, by averaging over those line periods during the course of which there are detected the locations. This is expressed in the following Equation (1) wherein $T$ signifies the line periods and reference character $i$ a whole number or integer index, and which Equation (1) can be expressed mathematically as follows:

Equation (1)
$$F(t) = \frac{1}{N} \cdot \sum_{i=1}^{i=N} f[t - (i-1) \cdot T]$$

wherein $N 1= R/r$ Equation (1) only can be used for a whole number or integer value of $R/r$. However, calculations also must be able to be made for intermediate values of $R/r$ since the scan locations in the image field form a continuum. The invention proceeds from the determination that, according to FIG. 1, and with an integer N in an interval defined by $$\frac{R}{(N+1)} \leq r \leq \frac{R}{N}$$

individual locations of the image field can be detected N-times, the remaining locations (N+1)-times per half-period of the field scanning, and that with increasing values of $r$ in the mentioned interval the proportion of (N+1)-times detected locations tends to shift from 1 to 0 (with increasing values of $r$ there are detected less locations (N+1)-times).

On the other hand, the value N does not constitute any previously known whole number or integer, because it is approximately derived from $R/r = N$. When carrying out a calculation according to Equation (1) the number of summands or addends cannot be limited to N, rather only to the higher yet known value $N_{max}$. In this way such summands are also added which do not contribute anything to the signal processing, but introduce additional noise.

To eliminate this drawback it is within the purview of the concepts of the invention to associate the individual summands and addends with a weighting factor which eliminates the undesired summands. For each location with a whole number of integer value $R/r = N$ the summands with associated index $i=1$ to $i=N$ are provided with the weighting 1, whereas the remaining summands with the associated index $i=(N+1)$ to $i=N_{max}$ with the weighting null. With a location with a noninteger value $R/r$, in other words then when $R/r = (N+X)$, wherein $N$ is equal to a whole number or integer and X a fractional number $(0<X<1)$, the summands with the associated index $i=1$ to $i=N$ are provided with the weighting 1 and the summands with the associated index $i=(N+2)$ to $i=N_{max}$ are provided with the weighting null, whereas the summand or addend with the associated index $i=(N+1)$ is provided with a weighting between null and 1, for instance the weighting X.

There is considered a slope function $s(w)$ which can be defined by the set of Equations (2):

Equations (2)

| | |
|---|---|
| $s(w) = 0$ | wherein $w < 0$ |
| $s(w) = w$ | wherein $0 \leq w \leq 1$ |
| $s(w) = 1$ | wherein $w > 1$ |

In order to be able to use the slope function $s(w)$ as the weighting factor in the sense of the concepts of the invention, there is to be introduced as the argument $w$ for instance $$w = \left(\frac{R}{r} - i + 1\right).$$

From Equation (1) and by inserting the weighting factor and expanding to all possible values of $R/r$ with $R/r = N_{max}$ as the boundary or threshold value, there can be derived the following Equation (3):

Equation 3

$$F(t) = \frac{r}{R} \cdot \sum_{i=1}^{i=N_{max}} f[t - (i-1) \cdot T] \cdot \left[s\left(\frac{R}{r} - i + 1\right)\right]$$

This Equation (3) portrays the behavior of a pseudo low-pass transverse of transversal filter with variable coefficients. It is easily recognizable that with a whole number or integer value $R/r$ the Equations (3) and (1) are identical.

For processing a scanning signal $f(t)$ into an output signal $F(t)$ according to Equation (3), there is proposed the following method which will be explained in conjunction with the block circuit diagram shown in FIG. 2 by way of example.

Form the scanning signal there is formed a multiplicity $N_{max}$ of primary or main signals each with an associated index $i=1$ to $i=N_{max}$. Each primary or main signal $i$ is time-delayed with regard to a predetermined other primary signal $i-1$ by the value of one period T of the line scanning, of course with the obvious exception of the primary signal $i=1$. This is achieved by means of conventional time-delay devices designated in FIG. 2 by reference characters $T_2 \ldots T_i \ldots T_{Nmax}$ (there will be explained further hereinafter the reason for the absence of the time-delay device $T_1$). Each time-delay device or circuit brings about a time-delay by the value T; all time-delay devices are connected in series and the first one, namely time-delay device $T_2$ is supplied with the scanning signal $f(t)$. Hence, there appears at each output of a time-delay device a primary or main signal and the primary signals form a sequence where there is present a stepwise or incrementally increasing delay in each instance by the amount of one period T. It is advantageous —although not absolutely necessary— to use as the first primary or main signal $i=1$, the scanning signal $f(t)$ itself, in which case there is possible saving the use of time-delay device $T_1$; it is for this reason that the last-mentioned time-delay device $T_1$ is not shown in FIG. 2. In equivalent manner the primary signals could be generated by a group ($N_{max}-1$) of time-delay devices or elements which are all connected in parallel and supplied by the scanning signal $f(t)$, and wherein each respective one thereof brings about the desired time-delay T, 2T, 3T, etc. For purposes of illustration the conductor or line 20 carrying the scanning signal $f(t)$ and the conductor 21 carrying the primary or main signal with the associated index $i=(N_{max}-1)$ have been designated in FIG. 2.

The additional or supplementary signal $r$ is time-dependent and therefore also designated as $r(t)$. In FIG. 2 there is shown that the supplementary signal $r(t)$ is delivered via the conductor or line 22 to a multiplicity $N_{max}$ of function generators which have been designated in FIG. 2 by reference characters $G_1 \ldots G_i \ldots G_{Nmax}$ (five such function generators here shown solely by way of example). Each function generator also has associated therewith a certain index $i$ between $i=1$ and $i=N_{max}$, and as a function of such index there is generated in the function generator with its associated index $i$ the function $$\left[\frac{r}{R} \cdot s\left(\frac{R}{r} - i + 1\right)\right].$$

The value R is predetermined, since R constitutes the maximum value of $r(t)$. The slope function $s(w)$ of an argument $w$ has been previously defined. Formation of the function $R/r$ from the function $r$, the generation of the argument $$\left(\frac{R}{r} - i + 1\right)$$

and the slope function $s$, as well as the multiplication of the slope function $s$ with the value $r/R$ are well known operations with the present day state of computer technology and therefore need not be further explained. As a result of the processing of the supplementary or additional signal $r$ in the function generators $G_1$ to $G_{Nmax}$, there appear at the outputs of such function generators a multiplicity $N_{max}$ of auxiliary signals each of which has associated therewith a respective predetermined index $i$. For purposes of portraying the same by way of example, there has been indicated in FIG. 2 the conductor or line 23 which carries the auxiliary signal with the associated index $i=(N_{max}-1)$ A respective auxiliary signal and a primary signal with the same associated index $i$ are multiplied together in a respective conventional multiplier, and there is produced a respective intermediate signal with which there is associated the same index $i$. The appropriate multiple number $N_{max}$ of multipliers has been designated in FIG. 2 by reference characters $M_1 \ldots M_i \ldots M_{Nmax}$ (there being shown strictly by way of example and not limitation for the discussed embodiment five such multipliers). For purposes of illustration there has been shown in FIG. 2 the conductor or line designated by reference character 24 which carries the intermediate signal with associated index $i=(N_{max}-1)$. All intermediate signals are summated or added in a conventional analog adder device or adder, there being formed an output signal $F(t)$ according to Equation (3). In FIG. 2 the adder has been designated by the symbol $\Sigma$, and the output signal $F(t)$ is carried by the conductor or line 25.

Starting from the determination that by feedback of an output signal of a time-delay device to its input there is formed a series of signals which among themselves exhibit an incrementally or stepwise increasing time-delay, a further concept of the invention proposes a recurrence technique which while only permitting of an approximation of the Equation (3) still however permits a performance with considerably less equipment expenditure, and therefore, is also extremely advantageous.

It is valid, for the method, as described previously and illustrated in FIG. 2, to replace all elements having associated therewith $i=2$ to $i=N_{max}$, with a single recursion or recurrence element which is associated with the index $k$, wherein the functions produced in the function generator $G_k$ as well as in the function generator $G_1$ are to be matched to such recurrence technique. By utilizing this concept there is derived a method from FIG. 2 which will be explained in conjunction with the following circuit diagram of FIG. 3. In connection therewith it is to be understood that the function generator $G_1$ and the multiplier device or multiplier $M_1$ as well as the adder or adder device $\Sigma$ have been carried over from the block circuit diagram of FIG. 2, whereas all of the function generators $G_2$ to $G_{Nmax}$ are replaced by a single function generator $G_k$ and all of the multipliers $M_2$ to $M_{Nmax}$ are replaced by a single multiplier $M_k$. Moreover, all of the time-delay devices or elements $T_2$ to $T_{Nmax}$ are replaced by a single time-delay device or element $T_k$, which, however, is no longer supplied by the scanning signal $f(t)$ rather by the output signal $F(t)$, so that in this instance there exists the recurrence technique. The scanning signal $f(t)$ is supplied by the conductor or line 30 only to the multiplier $M_1$, whereas the conductors or lines 31 to 35 carry out a function equivalent to that of the conductors or lines 21 to 25. Additionally, there is provided a conductor or line 36 which is intended to feedback the output signal $F(t)$ to the time-delay device or element $T_k$.

If the functions generated in the function generators $G_1$ and $G_k$ and dependent upon $r(t)$ are respectively designated by $g_1$ and $g_k$, then the method which has been shown in FIG. 3, by the block circuit diagram of apparatus utilized by way of example for the performance thereof, can be expressed mathematically by the following Equation (4).

Equation (4)

$$F(t) = g_k \cdot F(t - T) + g_1 \cdot f(t)$$

Equation (4) portrays the behavior of a pseudo-low-pass filter of the first order with a pseudo time-constant of $-T/\ln(g_k)$ and a damping of $g_1(1-g_k)$ at the frequency null. Now since it is desired to process the momentary scanning signal by correlation with $R/r$ earlier values of the scanning signal, for which purpose there must be detected a time duration of $T \cdot (R/r)$, then by equating this timme duration and the pseudo time constant there results the value $$g_k = \exp\left(-\frac{r}{R}\right),$$

and the value $$g_1 = \left[1 - \exp\left(-\frac{r}{R}\right)\right]$$

results as the condition for maximum sensitivity (damping = 1 at the frequency null of the scanning signal). Therefore, Equation (4) can be rewritten as following Equation (5):

Equation (5)

$$F(t) = \exp\left(-\frac{r}{R}\right) \cdot F(t - T) + \left[1 - \exp\left(-\frac{r}{R}\right)\right] \cdot f(t)$$

With this recurrence technique which is expressed by Equation (5), the output signal, during each passage through the recursion or recurrence loop (defined by components 36, $T_k$, 31, $M_k$, 34, $\Sigma$ of FIG. 3) is again delayed by a period T and attenuated or weakened by the factor $$\exp\left(-\frac{r}{R}\right).$$

The contribution of earlier line scannings to the momentary output signal therefore rapidly decays with increasing time-delay $\Delta t$, namely as $$\exp\left(-\frac{r}{R} \cdot \frac{\Delta t}{T}\right):$$

the recurrence technique converges.

With this recurrence method or technique there is generated, on the one hand, a primary or main signal with associated index $i=1$ which coincides with the scanning signal $f(t)$ and, on the other hand, there is generated a primary or main signal with associated index $k$ which collects and encompasses all primary signals with associated index $i \geq 2$. The time-delays corresponding to the primary signals with associated index $i$ are achieved by a means of a conventional time-delay device or element $T_k$. From the supplementary or additional signal $r(t)$ there is generated in a respective function generator $G_1$ and $G_k$ a respective auxiliary signal, wherein a respective one of such auxiliary signals is porportional to the function $$g_1 = \left[1 - \exp\left(-\frac{r}{R}\right)\right] \text{ and } g_k = \left[\exp\left(-\frac{r}{R}\right)\right];$$

with the present state of the computer technology it is known to form such type algebraic combinations of values and such type exponential values of an argument, and therefore, no further discussion in this regard is considered to be necessary. A respective auxiliary signal and a respective primary signal with the same associated index $i=1$ and $i=k$, respectively, are multiplied together in a respective conventional multiplier device or multiplier $M_1$ and $M_k$, respectively, resulting in a respective intermediate signal which is associated with the same index $i=1$ and $i=k$, respectively. These intermediate signals are summated or added in a conventional adder device $\Sigma$, there being formed an output signal $F(t)$ expressed by the Equation (5).

Upon comparison of the processing of a scanning signal $f(t)$ into an output signal $F(t)$ according to the direct tecqhnique or method described in conjunction with the circuit diagram of FIG. 2 and according to the recurrence method or technique described in conjunction with the circuit diagram of FIG. 3, it will be immediately apparent that a considerably lesser expenditure in equipment is needed for performance of the recurrence technique. This advantage is of course realized at the expense of a somewhat poorer processing of the signal. In the direct method, during each line scanning there is only taken into account the previously occurred R/r line scanning operations, and specifically with constant weighting. On the other hand, with the recurrence technique there is basically taken into account all prior line scanning operations, and specifically with decreasing weighting. In the direct method the weighting is not dependent upon the function $r(t)$, i.e. upon the spacing of the scanned locations from the center of the field (in Equation (3) the factor $r/R$ serves to form the mean or average value, not for weighting). On the other hand, with the recurrence technique the weighting is dependent upon the function $r(t)$. Consequently, the increase of the signal-to-noise ratio, due to processing of the scanning signal according to the recurrence technique, provides a result which cannot be as good as when processing according to the direct technique, the latter of which, however, requires a considerably greater expenditure in equipment.

The inventive method is preferably utilized for processing analog signals while making use of analog-functioning devices. However, this fact is not to be considered in any way as limiting of the concepts of the invention and other possibilities of utilization thereof, and consequently, there is in no way precluded —and it is expressly within the concepts of the invention— that individual ones or all of the signals can be processed in digital form and also individual ones or all of the devices can be used to function in a digital or hybrid mode of operation.

Finally, mention is still made of the fact that in the context and scope of the prior general discussion of the invention as well as in the context of the claims essentially conforming therewith, the reference character N can be used instead of the reference character $N_{max}$ for the multiplicity of the primary of main signals, and specifically for the purpose of simplicity.

While there is shown and described present preferred embodiments of the invention, it is to be distinctly understood that the invention is not limited thereto, but may be otherwise variously embodied and practiced within the scope of the following claims. Accordingly,

What is claimed is:

1. A method of increasing the signal-to-noise ratio of a time-dependent scanning signal produced during a periodic scanning operation, said operation comprising: (1) scanning a delineated and centered field line-by-line by means of a scanning device; (2) generating a time-dependent supplementary signal which corresponds to the spacing of the momentarily scanned location from the center of the field and possesses a momentary value $r$ and a maximum value R; and (3) performing successive line scanning operations in directions which change in each case through a predetermined angle and in such a manner that in accordance with the line width the neighboring lines contact one another at the boundary of the field and partially overlap within the field and at the center of the field completely overlap; the improvement comprising the steps of:

a. generating from the scanning signal a multiplicity of primary signals forming a sequence and which primary signals in this sequence possess a time-delay which incrementally increases in each instance by a period of the line scanning;

b. generating from the supplementary signal a multiplicity of auxiliary signals by means of a corresponding number of function generators;

c. multiplying a respective auxiliary signal in a respective multiplier with a respective associated primary signal for producing a respective intermediate signal; and d. adding the intermediate signals in an adder to produce an output signal.

2. The method as defined in claim 1, wherein from a multiplicity N of the primary signals there is produced a respective primary signal designated with the rank order $i$ from a sequence (2, $i$, N) by means of a respective associated time-delay element, the primary signal designated with the rank order 1 coinciding with the scanning signal, and by means of a respective function generator producing a respective auxiliary signal which is proportional to the product of the supplementary signal and a slope function, the slope function possessing the value $$\left( \frac{R}{r} - i + 1 \right)$$

between a lower threshold value null and an upper threshold value 1.

3. The method as defined in claim 1, wherein from a multiplicity N of the primary signals there are produced primary signals designated with the rank order $i$ from the sequence (2, $i$, N) by means of a signal time-delay element and feedback of the output signal to the single time-delay element in a recurrence operation, the primary signal designated with the rank order 1 coinciding with the scanning signal, there is produced from the supplementary signal a respective one of two auxiliary signals in a respective one of two function generators, and there is produced by one of said function generators an auxiliary signal proportional to the function $$\left[ 1 - \exp\left( -\frac{r}{R} \right) \right]$$

which is associated with the primary signal designated with the rank order 1, and by means of the other of said function generators there is produced an auxiliary signal proportional to the function $$\left[ \exp\left( -\frac{r}{R} \right) \right]$$

and associated with the primary signals designated with the rank order $i$ from the sequence (2, $i$, N).

4. A method of increasing the signal-to-noise ratio of a time-dependent scanning signal produced during a periodic scanning operation, said operation comprising: (1) scanning a defined bounded and centered field line-by-line by means of scanning device; (2) generating a time-dependent supplementary signal which essentially corresponds to the spacing of the momentarily scanned location from the center of the field and possesses a momentary value r and a maximum value R, and (3) performing successive line scanning operations in directions which change in each case through a predetermined angle and in such a manner that in accordance with the line width the neighboring lines adjoin one another at the boundary of the field and partially overlap within the field and at the center of the field completely overlap; the improvement comprising the steps of:
  a. generating from the scanning signal a multiplicity of primary signals forming a sequence and which primary signals in this sequence possess a time-delay which incrementally increases each time by a period of the line scanning;
  b. generating from the supplementary signal a multiplicity of auxiliary signals;
  c. multiplying a respective auxiliary signal with a respective associated primary signal for producing a respective intermediate signal; and
  d. adding the intermediate signals to produce an output signal.

5. The method as defined in claim 4, wherein from a multiplicity N of the primary signals there is produced a respective primary signal designated with the rank order $i$ from a sequence $(2, i, N)$, the primary signal designated with the rank order 1 coinciding with the scanning signal, and producing a respective auxiliary signal which is proportional to the product of the supplementary signal and a slope function, the slope function possessing the value $$\left(\frac{R}{r} - i + 1\right)$$

between a lower threshold value null and an upper threshold value 1.

6. The method as defined in claim 4, wherein from a multiplicity N of the primary signals there are produced primary signals designated with the rank order $i$ from the sequence $(2, i, N)$, there is fedback the output signal in a recurrence operation, the primary signal designated with the rank order 1 coinciding with the scanning signal, there is produced from the supplementary signal a respective one of two auxiliary signals, one of said auxiliary signals is proportional to the function $$\left[1 - \exp\left(-\frac{r}{R}\right)\right]$$

which is associated with the primary signal designated with the rank order 1 and the other auxiliary signal is proportional to the function $$\left[\exp\left(-\frac{r}{R}\right)\right]$$

associated with the primary signals designated with the rank order $i$ from the sequence $(2, i, N)$.

7. A method of increasing the signal-to-noise ratio of a time-dependent scanning signal produced during a periodic scanning operation, comprising the steps of:
  a. scanning line-by-line a bounded field having a central region;
  b. generating a time-dependent supplementary signal which essentially corresponds to the spacing of the momentarily scanned location from the central region of the field and possesses a momentary value r and a maximum value R;
  c. performing successive line scannings in directions which change each time following a line scanning through a predetermined angle in a manner such that as a function of the line width at least some of the scan lines adjoin one another at the boundary of the field, partially overlap within the field, and completely overlap at the central region of the field;
  d. generating from the scanning signal a multiplicity of primary signals forming a sequence and which possess a time-delay from one another which incrementally increases in each instance by a period of the line scanning;
  e. generating from the supplementary signal a multiplicity of auxiliary signals;
  f. multiplying a predetermined auxiliary signal with a predetermined associated primary signal for producing a respective intermediate signal; and
  g. adding the thus produced intermediate signals to form an output signal.

* * * * *